United States Patent Office 3,298,663
Patented Jan. 17, 1967

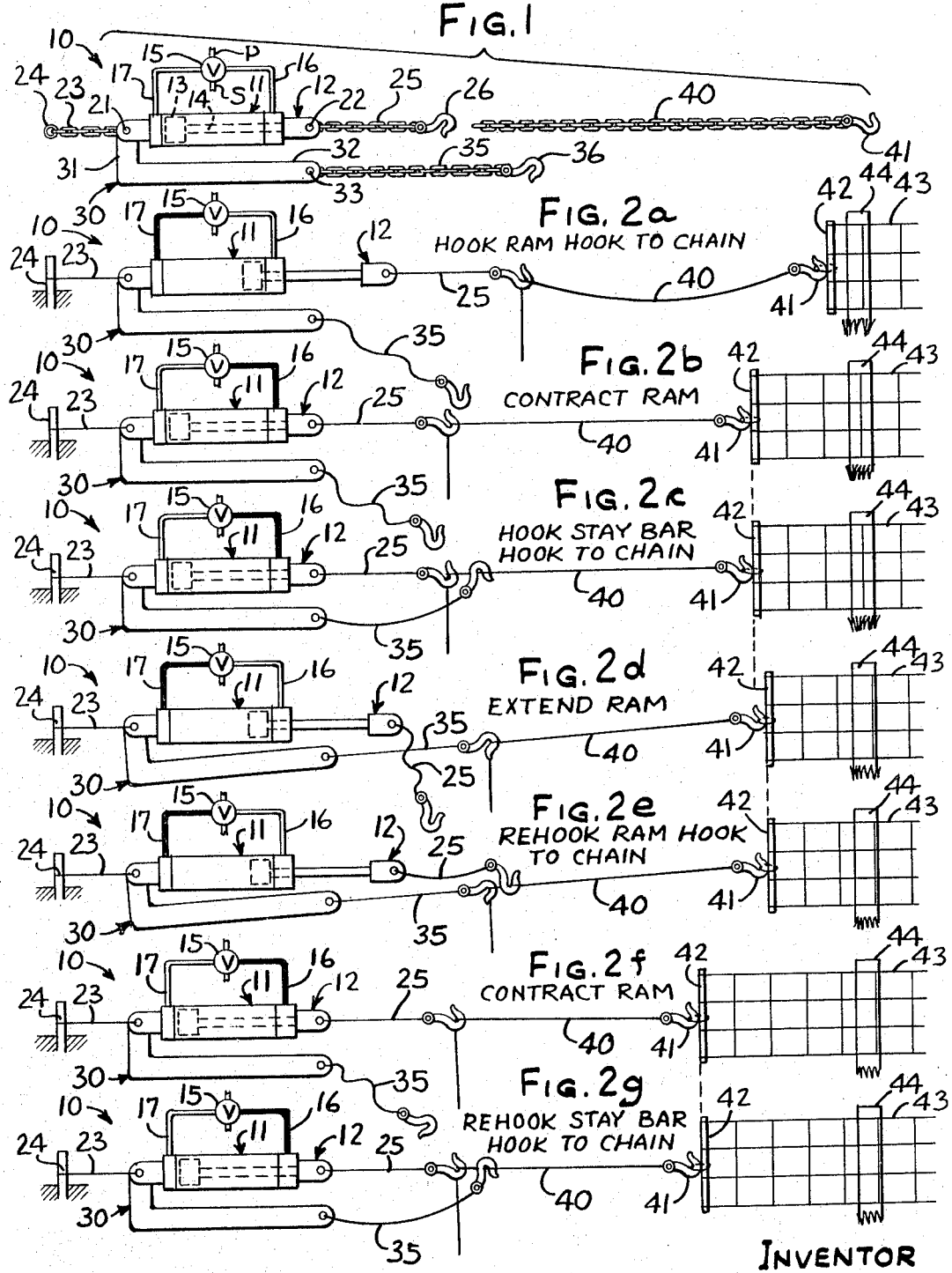

3,298,663
FENCE STRETCHER
Dale H. Hextell, Rte. 1, Maple Park, Ill. 60151
Filed Nov. 30, 1965, Ser. No. 510,559
2 Claims. (Cl. 254—83)

The present invention relates to fence stretchers and more particularly to a stretcher operated by hydraulic pressure.

Farm tractors are often equipped with an hydraulic actuator which is connected to a pump or valve on the tractor by a flexible hydraulic line to permit the actuator to be employed as a force-transmitting device for the pulling or pushing of a load in the field remote from other power sources.

One of the field chores requiring application of force is the stretching of fence, but conventional actuators, as supplied with a tractor, have not been well suited to fence stretching because of limited stroke.

It is accordingly an object of the present invention to provide a novel actuator assembly enabling a conventional actuator to be used for stretching a fence over a total distance which greatly exceeds the stroke of the actuator. It is a related object to provide an actuator arrangement for fence stretching or the like which makes use of a conventional actuator and which converts such actuator for fence stretching operations with little trouble or expense and without requiring that the actuator itself be modified in any way. Moreover, the actuator is inherently protected against impact or other damage which might affect its appearance or operating efficiency when it is returned to other usage.

Other objects and advantages of the invention will become apparent upon reading the attached detailed description and upon reference to the drawings in which:

FIGURE 1 shows an actuator assembly constructed in accordance with the present invention.

FIGURES 2a–2g inclusive are a set of stop motion views showing the manner in which the acuator arrangement of FIG. 1 is utilized for progressive stretching.

While the invention has been described in connection with a preferred embodiment, it will be understood that I do not intend to limit the invention to the particular embodiment but intend, on the contrary, to cover the various equivalent and alternative arrangements which may be included within the spirit and scope of the appended claims.

Turning now to FIG. 1 there is shown an actuator 10 which consists of a cylinder 11 and a ram 12. The ram is made up of a piston 13 and a piston rod 14. Hydraulic fluid is fed to the ends of the cylinder alternatively by a valve 15 having hydraulic connections 16, 17. Fluid is supplied to the valve via a supply line P and fluid is exhausted through a sump line S. As will be understood by one skilled in the art, the valve 15 which is preferably of the four way type, is movable between first and second positions in which pressure fluid is fed to the connection 16 or 17 with the exhausted fluid flowing into the sump. In the discussion which follows, the valve shall be deemed to be turned "on" when the connection 16 is pressurized, contracting the actuator, and turned "off" when the connection 17 is pressurized to restore the actuator to its extended condition.

At its left hand end the cylinder of the actuator provides a "first connection" 21 in the form of an eye while the piston rod 12 provides a "second connection" 22 in the form of an eye at the opposite end.

In accordance with the present invention a chain is provided connected to the fence, the first connection 21 is connected to a point of anchoring in alinement with the fence, the second connection 22 is provided with a line and disengageable hook for hooking on to the chain, and a stay bar is provided anchored to the first point of connection and extending parallel to the actuator to provide a third connection having a line and a disengageable second hook for hooking onto the chain. As a result, upon cycling of the valve and upon alternate hooking of the hooks to the chain, the load may be advanced a distance which substantially exceeds the stroke of the actuator. Thus, referring to the drawings, I provide a line 23 connected to the first connection 21 and leading to a point of anchoring 24. I also provide a line 25 coupled to the second connection 22 and terminating in a disengageable first hook 26. Extending alongside the actuator is a stay bar 30, preferably of dog leg shape, having a short portion 31, which is coupled at its left hand end to the first connection 21, and a long portion 32. The latter carries a third connection 33 adjacent the second connection 22. The third connection 33 is coupled by a line 35 to a second disengageable hook 36. The hooks 26, 36 are intended for connection between the links of a run of chain 40, with the right hand end 41 of the chain being adapted for connection to a "header" 42 at the end of a length of fence 43. The purpose is to stretch the fence 43 prior to stapling the fence wires to a post 44.

The sequence of operation for accomplishing this may be readily understood by reference to FIGS. 2a–2g inclusive. Initially, with the actuator anchored to its point of anchoring and with the ram extended, the first hook 26 is extended and hooked between adjacent links of the chain 40. The connection 17 in this figure is shown in solid black to indicate that it is pressurized, and this convention will be adhered to in the remaining figures.

Next, as shown in FIG. 2b, the valve 15 is turned "on" pressurizing the hydraulic connection 16 and causing the ram to contract, pulling the first hook 26 and the chain 40 and stretching the fence 43 to which the chain is connected.

The next step, as shown in FIG. 2c, is the connection of the second hook 36 on the stay bar to the chain 40.

Following this, the valve 15 is turned "off" as shown in FIG. 2d restoring the ram to its initial condition and permitting the first hook 26 to be unhooked. Thus the load is sustained by the second hook 36 on the stay bar.

Following this, as shown in FIG. 2e, with ram extended, the first hook 26 is rehooked to the chain 40 at a successive position along the chain.

After this is done, the valve 15 is again "turned on," as in FIG. 2f, pressurizing the connection 16 and contracting the actuator so that the chain 40 and fence are subjected to an additional step of movement. With the pressure at connection 16 sustained, the second hook 36 on the stay bar may be unhooked, following which the second hook may be rehooked in a successive position along the chain as shown in FIG. 2g.

The condition shown in FIG. 2g, it will be noted, is the same as that set forth in FIG. 2c, and the cycle represented by the steps 2c–2g inclusive may be repeated until the chain 40 has been taken up the desired amount, i.e., until the fence is stretched to the required degree.

It will be apparent that the total amount of advancement is unlimited, depending only upon the length of the chain 40, and may exceed the normal stroke of the actuator many times over. From the farmer's point of view the only effort which is required is that of turning the valve 15 between its "on" and "off" positions and the alternate "loose" hooking, onto the chain 40, of the first and second hooks 26, 36. The operation is safe since one of the two hooks is always in positive holding engagement with the chain. Nor is it possible, by making an error in the operation of the valve, to jeopardize the user, the equipment, or the fence-stretching operation.

The sequence of valve operation and hook movement is a simple one, easily acquired.

Use of the stay bar 30 is particularly advantageous since it provides a cylinder connection at the "load" end of the actuator, adjacent the ram connection, without any modification whatsoever of the actuator. The stay bar, moreover, protects the actuator from any chafing against the chain so that it is perfectly protected and preserved in its function and condition in spite of the heavy field usage. Thus actuators customarily supplied as an accessory to a commercial tractor, with associated valves and supply lines, may be used without exception, and the utility of the actuator for other purposes, and its intended fit into existing implements or other equipment, is not effected. The length of the stay bar 30 should be at least approximately the length of the actuator to properly accomplish its intended function.

While the invention has been described in connection with a double acting type of actuator, such type of actuator being most commonly supplied with a commercial tractor, it will be apparent that the invention is not limited thereto and an actuator capable of exerting force in the "contract" direction under the control of a simple on-off valve may be used.

In the following claims the term "chain" will be understood to be any longitudinal element capable of exerting a tensile force and having closely spaced points of attachment for alternate connection of hooks. The term "hook" shall be understood to include any terminal element capable of temporary attachment to the chain and capable of being advanced step by step along the chain as the chain is pulled incident to the stretching of the fence or the like. Also, it will be understood that while the terms "point of anchoring" and "load" have been used, it is intended that these terms be interchangeable since the entire assembly shown in FIG. 1 may be reversed, i.e., the hook 41 may be secured to the point of anchoring and the line 23 may be attached to the end of the fence without in any way departing from the present invention. Moreover, the stay bar may, if desired, be anchored to the end of the ram instead of the end of the cylinder. Thus the "first" and "second" mechanical connections referred to in the claims shall not be deemed "respective" as regards to the cylinder and ram. Finally, the term "stay bar" shall be understood to cover any member capable of longitudinal transmission of tensile force approximately the length of the actuator.

I claim as my invention:

1. A fence stretcher for stretching a fence or the like having a run of chain with respect to a point of anchoring aligned therewith comprising, in combination, an actuator having a cylinder and ram providing first and second mechanical connections at the opposite ends of the actuator, means for connecting the first connection to the point of anchoring, means including a disengageable hook for connecting the second connection to the run of chain, means including a valve for applying pressure fluid to the actuator for contracting the same to pull on the chain when the valve is turned on, a stay bar anchored to the first connection and having a third connection at its end in the region of the second connection, means including a second disengageable hook for connecting the third connection to the run of chain so that when the valve is turned off the chain is sustainingly held by the second hook permitting the ram to be extended and the first hook to be rehooked at a successive position along the run of chain and so that upon repetition thereof the fence may be advanced a distance substantially exceeding the stroke of the ram.

2. The combination recited in claim 1 in which the stay bar is of dog leg shape having its shorter portion anchored to the said first connection and its long portion arranged alongside the cylinder and extending at least approximately the length of the actuator.

References Cited by the Examiner
UNITED STATES PATENTS

| | | | |
|---|---|---|---|
| 780,837 | 1/1905 | Sydenstricker | 254—74 |
| 803,441 | 10/1905 | Shaw et al. | 254—83 |
| 2,947,275 | 8/1960 | Edmonds | 254—51 X |

WILLIAM FELDMAN, *Primary Examiner.*

MILTON S. MEHR, *Examiner.*